United States Patent
Huang et al.

(10) Patent No.: US 12,401,291 B2
(45) Date of Patent: Aug. 26, 2025

(54) POWER FACTOR HIGH-VOLTAGE END SYNCHRONOUS RECTIFIER

(71) Applicant: YANNIS ELECTRONICS CO., LTD., New Taipei (TW)

(72) Inventors: Wei-Ming Huang, New Taipei (TW); Po-Chia Chen, New Taipei (TW)

(73) Assignee: YANNIS ELECTRONICS CO., LTD., New Taipei (TW)

( * ) Notice: Subject to any disclaimer, the term of this patent is extended or adjusted under 35 U.S.C. 154(b) by 281 days.

(21) Appl. No.: 18/327,203

(22) Filed: Jun. 1, 2023

(65) Prior Publication Data
US 2024/0356452 A1 Oct. 24, 2024

(30) Foreign Application Priority Data
Apr. 20, 2023 (TW) ................. 112114851

(51) Int. Cl.
*H02M 3/335* (2006.01)
*H02M 1/00* (2006.01)
*H02M 1/42* (2007.01)

(52) U.S. Cl.
CPC ..... *H02M 3/33592* (2013.01); *H02M 1/0009* (2021.05); *H02M 1/4266* (2013.01)

(58) Field of Classification Search
CPC ........... H02M 3/33592; H02M 1/0009; H02M 1/4266

USPC .......................................................... 363/89
See application file for complete search history.

(56) References Cited

U.S. PATENT DOCUMENTS

| | | | | |
|---|---|---|---|---|
| 2019/0372472 | A1* | 12/2019 | Huang | H10D 84/811 |
| 2021/0226540 | A1* | 7/2021 | Zhao | H02M 3/33592 |
| 2022/0393574 | A1* | 12/2022 | Pervaiz | H02M 3/33592 |

* cited by examiner

*Primary Examiner* — Yemane Mehari
(74) *Attorney, Agent, or Firm* — Chun-Ming Shih; LANWAY IPR SERVICES

(57) ABSTRACT

A power factor high-voltage end synchronous rectifier includes a bridge rectifying module, a power factor module and a high-voltage synchronous rectifier, whereby the high-voltage synchronous rectifier obtains the state of a second power outputted by the bridge rectifying module through a current detector and generates first and second control signals. The first control signal adjusts the on/off state of a first wide bandgap compound semiconductor of the power factor module, and the second control signal adjusts the on/off state of a second wide bandgap compound semiconductor of the power factor module, allowing the high-voltage synchronous rectifier to generate a plurality of control signals at the same time, so that the second power of the power module can be switched between continuous conduction mode (CCM), discontinuous conduction mode (DCM) and quasi resonant mode (QR) in a very short time (can be regarded as zero second in an ideal state).

7 Claims, 3 Drawing Sheets

POWER FACTOR HIGH-VOLTAGE END SYNCHRONOUS RECTIFIER

BACKGROUND OF THE INVENTION

1. Field of the Invention

The invention relates to a power factor high-voltage end synchronous rectifier, and more particularly, to a power factor high-voltage end synchronous rectifier that is capable of reducing power consumption while being applicable in discontinuous conduction mode (DCM), continuous conduction mode (CCM) and quasi resonant (QR) mode.

2. Description of the Prior Art

The technology of switching-mode power supply (SMPS) has been widely used in the production of power supplies for various electrical devices and electronic products. With the trend of electronic products becoming lighter, thinner and smaller, it is necessary to increase the power density of SMPS by increasing the switching frequency, in order to effectively reduce the size of the SMPS mechanism. In view of this, LLC resonant converters with Zero Voltage Switching (ZVS) and Zero Current Switching (ZCS) characteristics have been proposed.

Power Factor Correction (PFC) is a circuit that can improve the power factor of the power supply end and is commonly used in the aforementioned SMPS. It can be mainly divided into passive PFC, active PFC, and dynamic PFC. Regardless of which type of PFC circuit, it outputs a single control signal. For today's high-voltage, high-frequency power inputs, and the need for multiple voltage outputs, even slight delays can lead to less than ideal power supply outputs. Especially at the output end, all PFC circuits use simple diodes as isolation, and losses increase as the load increases.

In view of the shortcomings in the prior art, the present disclosure is proposed to provide improvements that address these shortcomings.

SUMMARY OF THE INVENTION

One main objective of the present disclosure is to provide a power factor high-voltage end synchronous rectifier capable of reducing power consumption.

Another objective of the present disclosure is to provide a power factor high-voltage end synchronous rectifier that can be used in discontinuous conduction mode (DCM), continuous conduction mode (CCM) and quasi resonant (QR) mode.

Yet another objective of the present disclosure is to provide a power factor high-voltage end synchronous rectifier that can be applied to different types of power supplies.

In order to achieve the above objectives and efficacies, the technical means employed by the present disclosure may include: a bridge rectifying module, a power factor module and a high-voltage synchronous rectifier.

The bridge rectifying module may include a positive output terminal and a negative output terminal for converting an alternating current (AC) first electrical energy into a direct current (DC) second electric energy, and the second electrical energy being output through the positive output terminal.

The power factor module may be electrically connected to the bridge rectifying module and may include: a power factor correction (PFC) inductor, a first wide bandgap compound semiconductor, a second wide bandgap compound semiconductor and a current detector.

The PFC inductor may be electrically connected to the positive output terminal of the bridge rectifying module.

The first wide bandgap compound semiconductor may include a first gate, a first drain and a first source, the first drain being electrically connected with the PFC inductor, and the first source being electrically connected to the negative output terminal of the bridge rectifying module.

The second wide bandgap compound semiconductor may include a second gate, a second drain and a second source, the second source being electrically connected to the first drain.

The current detector may include a first pin, a second pin, a third pin and a fourth pin.

The first pin may be electrically connected to the second drain and the third pin may be electrically connected to an overall output terminal.

The high-voltage synchronous rectifier may include a first control terminal, a second control terminal, a first input terminal, and a second input terminal, wherein:

The first control terminal may be electrically connected to the first gate of the first wide bandgap compound semiconductor, the second control terminal may be electrically connected to the second gate of the second wide bandgap compound semiconductor, the first input terminal may be electrically connected to the second pin of the current detector, and the second input terminal may receive a PWM signal.

As a result, the first input terminal of the high-voltage synchronous rectifier obtains the state of the second electrical energy through the second pin of the current detector, and at the same time, the high-voltage synchronous rectifier obtains the PWM signal from the second input terminal, then the high-voltage synchronous rectifier generates a first control signal and a second control signal, the first control terminal transmits the first control signal to control the on or off state of the first wide bandgap compound semiconductor, and the second control terminal transmits the second control signal to control the on or off state of the second wide bandgap compound semiconductor, so that the second electrical energy of the bridge rectifying module is switched between continuous conduction mode (CCM) and discontinuous conduction mode (DCM), and quasi resonant mode (QR).

Based on the structure above, the bridge rectifying module may include: a filter for receiving a first electrical energy from a predetermined external power source and eliminating ripples in the first electrical energy; a full-wave rectifier electrically connected to the filter having the positive output terminal and the negative output terminal, the full-wave rectifier converting the AC first electrical energy into the DC second electrical energy, the second electrical energy being output through the positive output terminal Based on the structure above, the high-voltage synchronous rectifier may receive the PWM signal and the second electrical energy, and generate the first control signal to control the first gate and generate the second control signal to control the second gate in the following modes:

When the PWM signal is at High (Hi) and the current detector is at Low (Lo), the first control signal at Hi is generated to control the first gate, turning the first wide bandgap semiconductor on, meanwhile, the second control signal at Lo is generated to control the second gate, turning the second wide bandgap semiconductor off.

When the PWM signal is at Hi and the current detector is at Hi, the first control signal at Hi is generated to control the first gate, turning the first wide bandgap semiconductor on, meanwhile, the second control signal at Lo is generated to control the second gate, turning the second wide bandgap semiconductor off.

Based on the structure above, the high-voltage synchronous rectifier may receive the PWM signal and the second electrical energy, and generate the first control signal to control the first gate and generate the second control signal to control the second gate in the following modes:

When the PWM signal is at Lo and the current detector is at Lo, the first control signal at Lo is generated to control the first gate, turning the first wide bandgap semiconductor off, meanwhile, the second control signal at Lo is generated to control the second gate, turning the second wide bandgap semiconductor off.

When the PWM signal is at Lo and the current detector is at Hi, the first control signal at Lo is generated to control the first gate, turning the first wide bandgap semiconductor off, meanwhile, the second control signal at Hi is generated to control the second gate, turning the second wide bandgap semiconductor on.

Based on the structure above, the current detector may be a resistive type, a magnetic type with an iron core, a magnetic type without an iron core, or a current comparator.

Based on the structure above, the first or second wide bandgap compound semiconductor may be a metal-oxide-semiconductor field-effect transistor (MOSFET) made of silicon carbide (SiC) or a MOSFET made of gallium nitride (GaN).

Based on the structure above, the PFC inductor may be a low impedance coil and a choke coil.

The objectives, efficacies and features of the present disclosure can be more fully understood by referring to the drawing as follows:

DETAILED DESCRIPTION OF THE PREFERRED EMBODIMENTS

Figure 1:
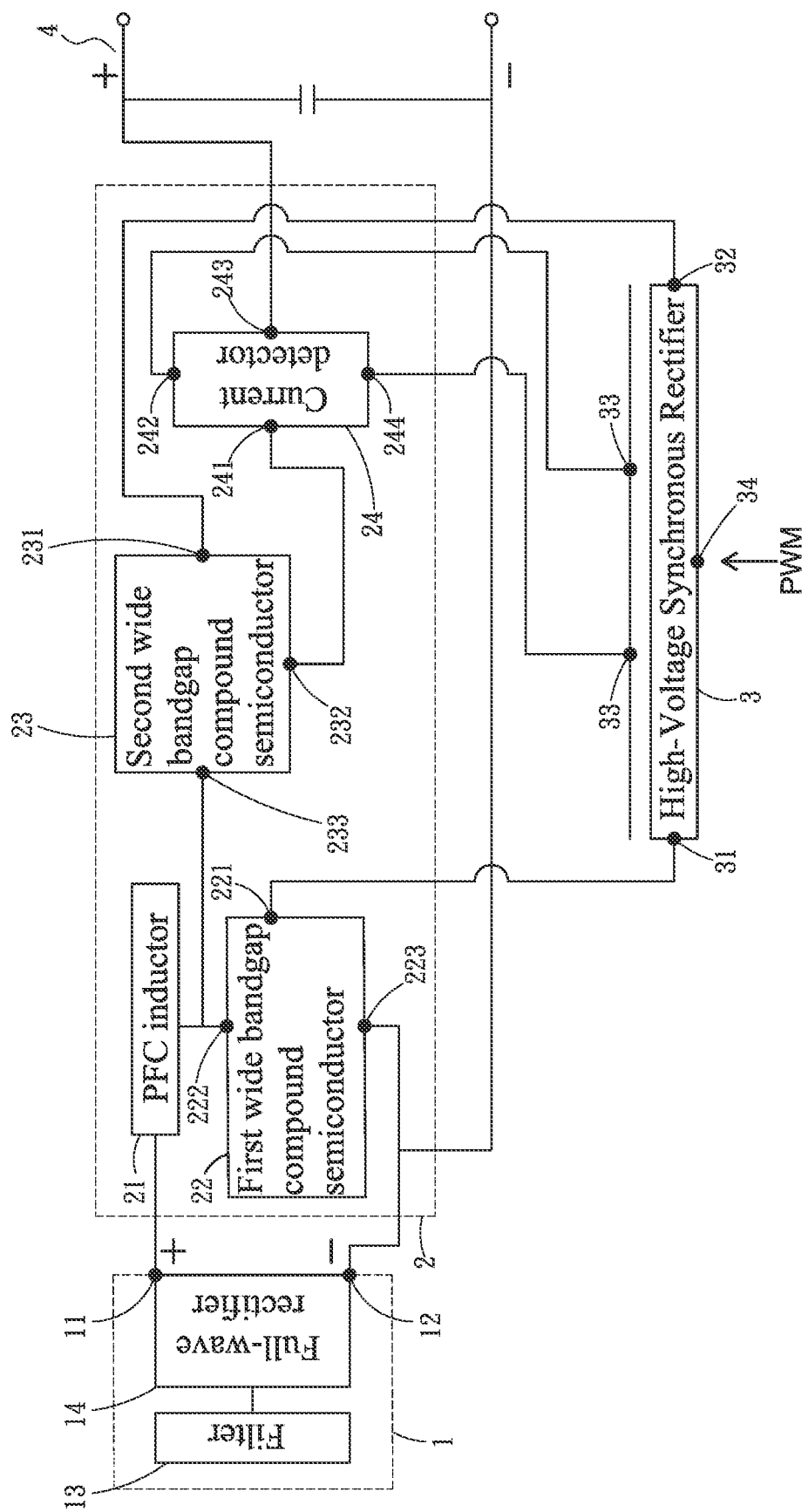
FIG. 1 is a block diagram of a preferred embodiment of the present disclosure.

Referring to FIG. 1, the structure of the invention includes a bridge rectifying module 1, a power factor module 2, and a high-voltage synchronous rectifier 3.

The bridge rectifying module 1 includes a filter 13 and a full-wave rectifier 14.

The filter 13 is connected to an external power source and is used to receive and eliminate ripples and noise from a first electrical energy.

The full-wave rectifier 14 has a positive output terminal 11 and a negative output terminal 12.

The full-wave rectifier 14 converts the AC-type first electrical energy to a DC-type second electrical energy and outputs it through the positive output terminal 11.

The power factor module 2 is connected to the bridge rectifying module 1 and includes a power factor correction (PFC) inductor 21, a first wide bandgap compound semiconductor 22, a second wide bandgap compound semiconductor 23 and a current detector 24.

The PFC inductor 21 is connected to the positive output terminal 11 of the full-wave rectifier 14. In a preferred embodiment, the PFC inductor can be a low impedance coil or a choke coil.

The first wide bandgap compound semiconductor 22 has a first gate 221, a first drain 222, and a first source 223.

The first drain 222 is electrically connected to the PFC inductor 21, and the first source 223 is electrically connected to the negative output terminal 12 of the full-wave rectifier 14.

The second wide bandgap compound semiconductor 23 has a second gate 231, a second drain 232, and a second source 233.

The second source 233 is electrically connected to the first drain 222 of the first wide bandgap compound semiconductor 22.

In another preferred embodiment, the first and second wide bandgap compound semiconductors can be metal-oxide-semiconductor field-effect transistors (MOSFETs) made of silicon carbide (SiC) or gallium nitride (GaN).

The current detector 24 has a first pin 241, a second pin 242, a third pin 243, and a fourth pin 244.

The first pin 241 is electrically connected to the second drain 232 of the second wide bandgap compound semiconductor 23, and the third pin 243 is electrically connected to the overall output terminal 4.

In a preferred embodiment, the current detector 24 can be resistive, magnetic with an iron core, magnetic without an iron core, or a current comparator.

The high-voltage synchronous rectifier 3 has a first control terminal 31, a second control terminal 32, a first signal terminal 33, and a second signal terminal 34.

The first control terminal 31 is electrically connected to the first gate 221 of the first wide bandgap compound semiconductor 22.

The second control terminal 32 is electrically connected to the second gate 231 of the second wide bandgap compound semiconductor 23.

The first signal terminal 33 is electrically connected to the second pin 242 of the current detector 24.

The second input terminal 34 receives a PWM signal.

Thus, the first signal terminal 33 of the high-voltage synchronous rectifier 3 obtains the status of the current of the second electrical energy through the second pin 24 of the current detector 24. The high-voltage synchronous rectifier 3 obtains the PWM signal from the second signal terminal 34, and then generates a first control signal and a second control signal. The first control terminal 31 transmits the first control signal for controlling the on/off state of the first wide bandgap semiconductor 22, and the second control terminal 32 transmits the second control signal for controlling the on/off state of the second wide bandgap semiconductor 23, so that the second electrical energy of the bridge rectifying module 1 can switch between the continuous conduction mode (CCM), discontinuous conduction mode (DCM), and quasi resonant mode (QR).

Figure 2:
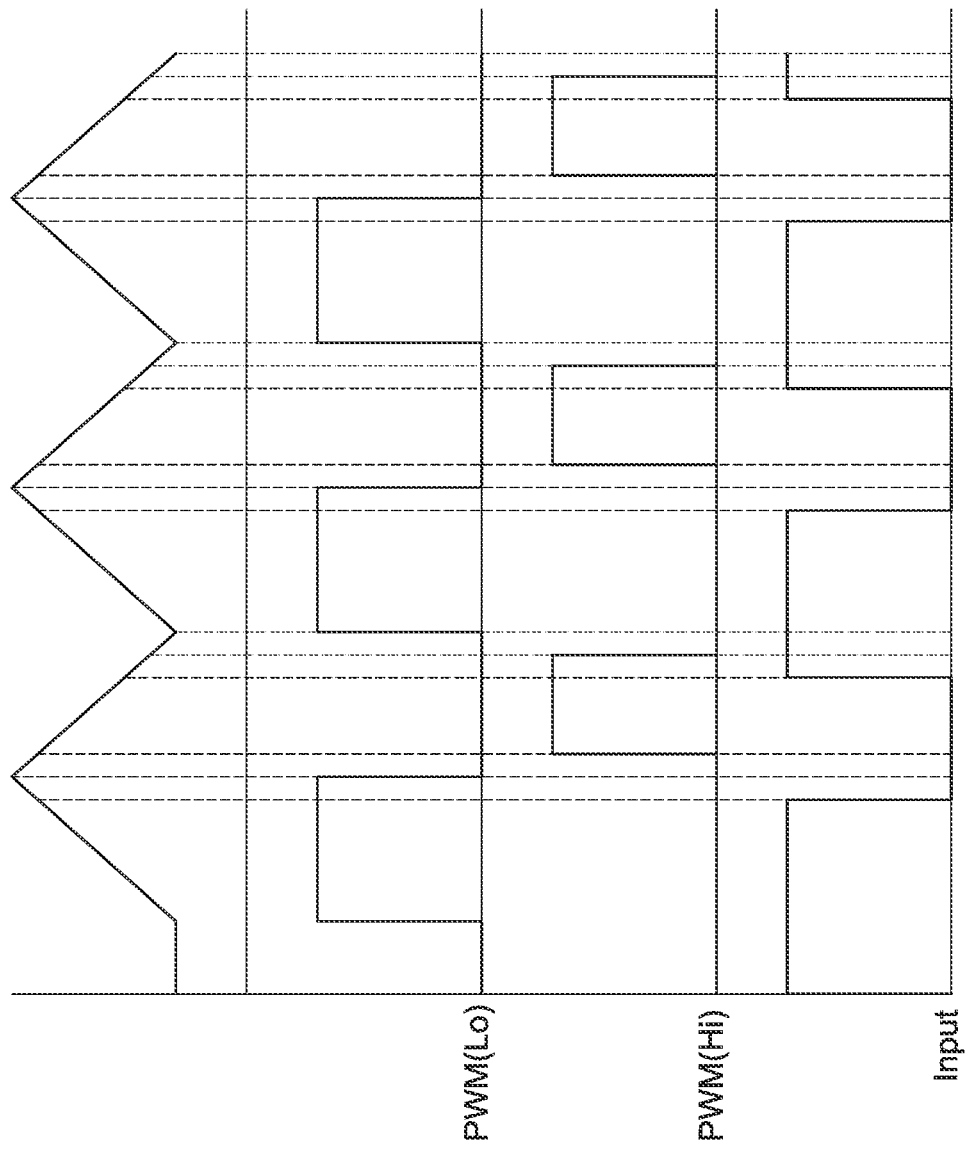
FIG. 2 is a first waveform of a preferred embodiment of the present disclosure.

Referring to both FIGS. 1 and 2 at the same time. FIG. 2 shows the waveform of the present disclosure during operation. In a preferred embodiment, the structure of the present disclosure shown in FIG. 1 is connected to a conventional power supply circuit, and the "Input" in FIG. 2 represents an existing input control in the conventional power supply circuit. In addition, "PWM" in FIGS. 1 and 2 represents an existing PWM input signal in the current power supply circuit. FIG. 2 represents the operating state of the present disclosure under continuous conduction mode (CCM) after combining with the current power supply circuit.

The high-voltage synchronous rectifier 3 receives the PWM signal and the second electrical energy, and generates the first control signal to control the first gate 221 and generates the second control signal to control the second gate 231 in the following modes:

When the PWM signal is at High (Hi) and the current detector is at Low (Lo), a Hi first control signal is generated to control the first gate 221, turning the first wide bandgap semiconductor 22 on. At the same time, a Lo second control signal is generated to control the second gate 231, turning the second wide bandgap semiconductor 23 off.

When the PWM signal is at Hi and the current detector is at Hi, a Hi first control signal is generated to control the first gate 221, turning the first wide bandgap semiconductor 22 on. At the same time, a Lo second control signal is generated to control the second gate 231, turning the second wide bandgap semiconductor 23 off.

When the current power supply circuit (which may be a controller, a signal generator, or another electronic circuit combination capable of generating a PWM signal) sends a PWM signal, the PWM signal is received by the second signal terminal 34 of the high-voltage synchronous rectifier 3. At the same time, the state of the second electrical energy is obtained by the first signal terminal 33 of the high-voltage synchronous rectifier 3 (obtained from the second pin 242 of the current detector 24), the high-voltage synchronous rectifier 3 then generates the first control signal and the second control signal depending on a combination of the PWM signal and the state of the second electrical energy. The first control signal is transmitted to the first wide bandgap semiconductor 22 through the first control terminal 31 of the high-voltage synchronous rectifier 3, and the second control signal is transmitted to the second wide bandgap semiconductor 23 through the second control terminal 32 of the high-voltage synchronous rectifier 3. In a preferred embodiment, the high-voltage synchronous rectifier 3 controls the first and second control signals, such that the first and second control signals are interlocked to prevent both from conducting at the same time.

Figure 3:
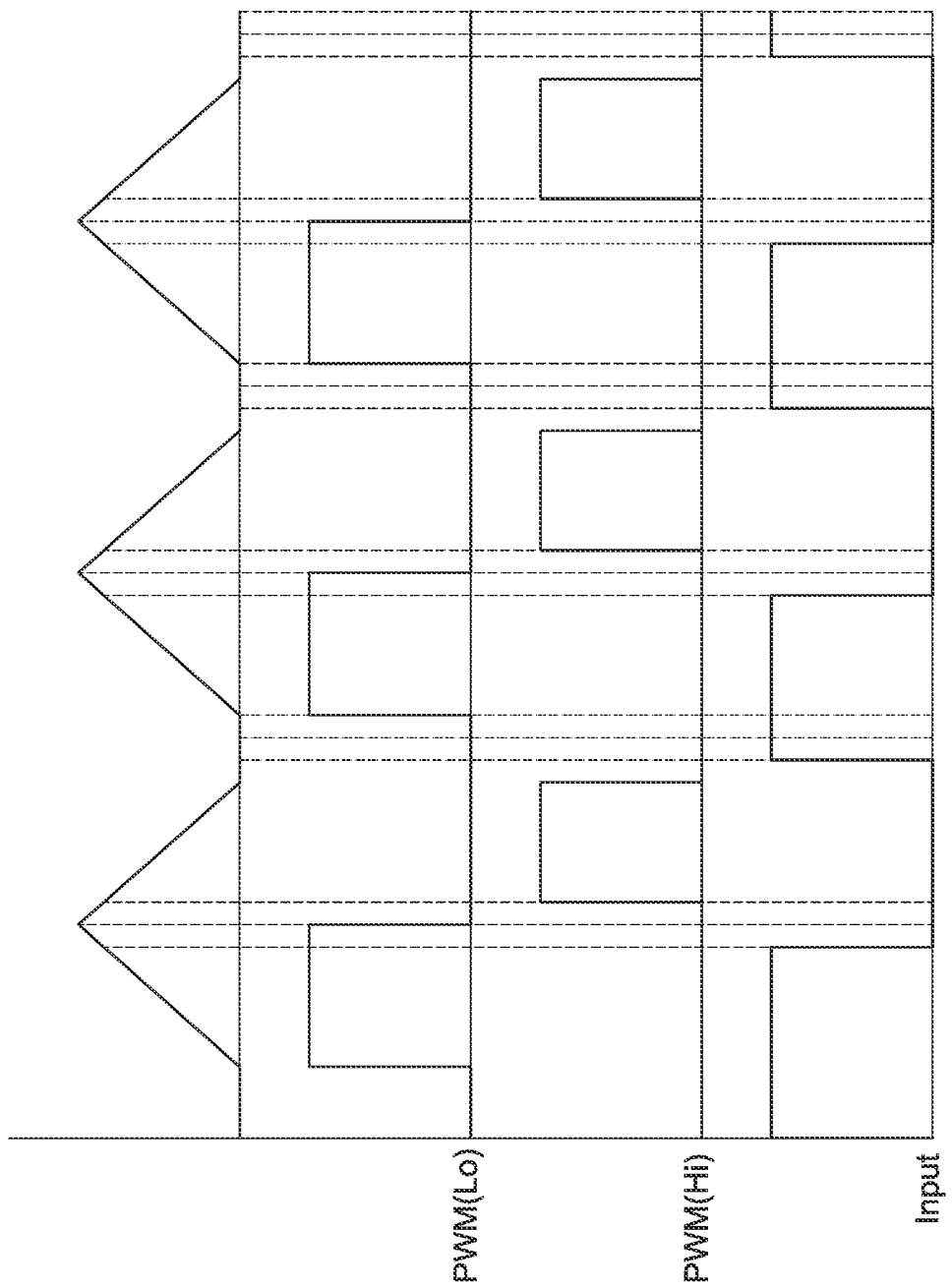
FIG. 3 is a second waveform of a preferred embodiment of the present disclosure.

Referring to both FIGS. 1 and 3 at the same time, FIG. 3 shows the waveform of the present disclosure during operation. Descriptions that are the same as those described in the preferred embodiment above (with respect to FIGS. 1 and 2) will not repeated again. FIG. 3 represents the operating states of the present disclosure under discontinuous conduction mode (DCM) and quasi resonant (QR) mode after combining with the current power supply circuit.

The high-voltage synchronous rectifier 3 receives the PWM signal and the second electrical energy, and generates the first control signal to control the first gate 221 and generates the second control signal to control the second gate 231 in the following modes:

When the PWM signal is at Lo and the current detector is at Lo, a Lo first control signal is generated to control the first gate 221, turning the first wide bandgap semiconductor 22 off. At the same time, a Lo second control signal is generated to control the second gate 231, turning the second wide bandgap semiconductor 23 off.

When the PWM signal is at Lo and the current detector is at Hi, a Lo first control signal is generated to control the first gate 221, turning the first wide bandgap semiconductor 22 off. At the same time, a Hi second control signal is generated to control the second gate 231, turning the second wide bandgap semiconductor 23 on. It should be noted that, in this embodiment, descriptions related to the signal transmission and circuit connections of the current power supply circuit can be found to the relevant paragraphs of the preferred embodiment above (descriptions with respect to FIGS. 1 and 2) and will not repeated again.

In summary of the descriptions with respect to FIGS. 1 to 3 above, a truth table of the present disclosure can be as follows:

| PWM IN | Hi | Hi | Lo | Lo |
|---|---|---|---|---|
| Current Detector | Lo | Hi | Lo | Hi |
| First Control Signal | Hi | Hi | Lo | Lo |
| Second Control Signal | Lo | Lo | Lo | Hi |
| First Wide Bandgap Compound Semiconductor | ON | ON | OFF | OFF |
| Second Wide Bandgap Compound Semiconductor | OFF | OFF | OFF | ON |

The present disclosure is further illustrated with an example: Under the traditional architecture, the loss of a boost diode is $((1-D)*Vf*If)$. By reducing the loss and increasing efficiency through the architecture of the present disclosure:

Vf: Forward voltage drop;

IF: Forward current;

Rdson: Conductive impedance of the first wide bandgap compound semiconductor 22 or the second wide bandgap compound semiconductor 23 mentioned before;

Then, the loss generated by Vf, If, and Rdson is $[(1-D)*Rdson*If]$;

For example: For a power of 300 W, IF≈300/90 Vac (maximum effective current)≈3.33 A;

D=0.4 duty cycle, Vf≈1.2V;

Therefore, $(1-0.4)*1.2*3.33$ A=2.39 W;

With the structure of the present disclosure, $(1-0.4)*0.055*3.332$ A=0.3659 W, increasing efficiency by at least 0.6%. The above is just an example of how efficiency improvement is calculated, and the efficiency improvement achieved by the present disclosure is not limited to 0.6%.

In view of this, the present disclosure is submitted to be novel and non-obvious and a patent application is hereby filed in accordance with the patent law. It should be noted that the descriptions given above are merely descriptions of preferred embodiments of the present disclosure, various changes, modifications, variations or equivalents can be made to the invention without departing from the scope or spirit of the invention. It is intended that all such changes, modifications and variations fall within the scope of the following appended claims and their equivalents.

What is claimed is:

1. A power factor high-voltage end synchronous rectifier, comprising:

a bridge rectifying module including a positive output terminal and a negative output terminal for converting an alternating current (AC) first electrical energy into a direct current (DC) second electric energy, and the second electrical energy being output through the positive output terminal;

a power factor module electrically connected to the bridge rectifying module including:

a power factor correction (PFC) inductor electrically connected to the positive output terminal of the bridge rectifying module;

a first wide bandgap compound semiconductor having a first gate, a first drain and a first source, the first drain being electrically connected with the PFC inductor, and the first source being electrically connected to the negative output terminal of the bridge rectifying module;

a second wide bandgap compound semiconductor having a second gate, a second drain and a second source, the second source being electrically connected to the first drain;
a current detector having a first pin, a second pin, a third pin and a fourth pin, the first pin being electrically connected to the second drain, the third pin being electrically connected to an overall output terminal; and,
a high-voltage synchronous rectifier having a first control terminal, a second control terminal, a first input terminal, and a second input terminal, wherein:
the first control terminal is electrically connected to the first gate of the first wide bandgap compound semiconductor,
the second control terminal is electrically connected to the second gate of the second wide bandgap compound semiconductor,
the first input terminal is electrically connected to the second pin of the current detector, and
the second input terminal receives a PWM signal,
whereby the first input terminal of the high-voltage synchronous rectifier obtains the state of the second electrical energy through the second pin of the current detector, and at the same time, the high-voltage synchronous rectifier obtains the PWM signal from the second input terminal, the high-voltage synchronous rectifier then generates a first control signal and a second control signal, the first control terminal transmits the first control signal to control the on or off state of the first wide bandgap compound semiconductor, and the second control terminal transmits the second control signal to control the on or off state of the second wide bandgap compound semiconductor, so that the second electrical energy of the bridge rectifying module is switched between continuous conduction mode (CCM) and discontinuous conduction mode (DCM), and quasi resonant mode (QR).

2. The power factor high-voltage end synchronous rectifier of claim 1, wherein the bridge rectifying module includes:
a filter for receiving the first electrical energy from a predetermined external power source and eliminating ripples in the first electrical energy;
a full-wave rectifier electrically connected to the filter having the positive output terminal and the negative output terminal, the full-wave rectifier converting the AC first electrical energy into the DC second electrical energy, the second electrical energy being output through the positive output terminal.

3. The power factor high-voltage end synchronous rectifier of claim 1, wherein the high-voltage synchronous rectifier receives the PWM signal and the second electrical energy, and generates the first control signal to control the first gate and generates the second control signal to control the second gate in the following modes:
when the PWM signal is at High (Hi) and the current detector is at Low (Lo), the first control signal at Hi is generated to control the first gate, turning the first wide bandgap semiconductor on, meanwhile, the second control signal at Lo is generated to control the second gate, turning the second wide bandgap semiconductor off;
when the PWM signal is at Hi and the current detector is at Hi, the first control signal at Hi is generated to control the first gate, turning the first wide bandgap semiconductor on, meanwhile, the second control signal at Lo is generated to control the second gate, turning the second wide bandgap semiconductor off.

4. The power factor high-voltage end synchronous rectifier of claim 1, wherein the high-voltage synchronous rectifier receives the PWM signal and the second electrical energy, and generates the first control signal to control the first gate and generates the second control signal to control the second gate in the following modes:
when the PWM signal is at Lo and the current detector is at Lo, the first control signal at Lo is generated to control the first gate, turning the first wide bandgap semiconductor off, meanwhile, the second control signal at Lo is generated to control the second gate, turning the second wide bandgap semiconductor off;
when the PWM signal is at Lo and the current detector is at Hi, the first control signal at Lo is generated to control the first gate, turning the first wide bandgap semiconductor off, meanwhile, the second control signal at Hi is generated to control the second gate, turning the second wide bandgap semiconductor on.

5. The power factor high-voltage end synchronous rectifier of claim 1, wherein the current detector is at least one selected from the group consisting of a resistive type, a magnetic type with an iron core, a magnetic type without an iron core, and a current comparator.

6. The power factor high-voltage end synchronous rectifier of claim 1, wherein the first or second wide bandgap compound semiconductor is at least one selected from the group consisting of a metal-oxide-semiconductor field-effect transistor (MOSFET) made of silicon carbide (SiC) and a MOSFET made of gallium nitride (GaN).

7. The power factor high-voltage end synchronous rectifier of claim 1, wherein the PFC inductor is at least one selected from the group consisting of a low impedance coil and a choke coil.

* * * * *